United States Patent [19]

Pina et al.

[11] Patent Number: 5,893,549
[45] Date of Patent: Apr. 13, 1999

[54] SLOTTED SUPPORT FOR X-RAY FOCUSING MIRRORS

[75] Inventors: Ladislav Pina; Adolf Inneman, both of Prague, Czech Rep.; Ulrich Wolfgang Arndt, Cambridge; David Keith Bowen, Coventry, both of United Kingdom

[73] Assignee: Medical Research Council, London, United Kingdom

[21] Appl. No.: 08/754,195

[22] Filed: Nov. 27, 1996

[30] Foreign Application Priority Data

Nov. 29, 1995 [GB] United Kingdom ................ 9524440

[51] Int. Cl.$^6$ ..................................................... G02B 5/30
[52] U.S. Cl. ......................... 359/846; 359/847; 359/856; 378/145; 378/147
[58] Field of Search ........................... 378/138, 145, 378/147; 359/846, 847, 855, 856, 857, 858, 861, 864, 868, 869, 871, 838, 840, 850, 862, 863, 851, 852, 853; 40/900; 248/466, 473

[56] References Cited

U.S. PATENT DOCUMENTS

| | | | |
|---|---|---|---|
| 2,430,551 | 11/1947 | Arnold et al. | 359/856 |
| 2,653,249 | 9/1953 | Harker | 378/145 |
| 3,687,524 | 8/1972 | Martinez | 359/847 |
| 4,262,660 | 4/1981 | Ilich | 126/451 |
| 4,299,446 | 11/1981 | Jenkins, Jr. | 359/846 |
| 4,303,308 | 12/1981 | Kobrin | 359/864 |
| 4,331,382 | 5/1982 | Graff | 359/868 |
| 4,429,953 | 2/1984 | Zehnpfennig et al. | 359/846 |
| 5,222,000 | 6/1993 | Adler | 359/847 |

FOREIGN PATENT DOCUMENTS

| | | | |
|---|---|---|---|
| A 2725952 | 12/1978 | Germany | 359/868 |
| 1324072 | 7/1987 | Russian Federation | 378/145 |

*Primary Examiner*—Cassandra Spyrou
*Assistant Examiner*—John Juba, Jr.
*Attorney, Agent, or Firm*—Lee, Mann, Smith, McWilliams, Sweeney & Ohlson

[57] ABSTRACT

Mirror support means having a metal block machined with a first pair of slots shaped to receive a first pair of curved mirrors and a second pair of slots shaped to receive a second pair of curved mirrors. The block is sufficiently resiliently deformable to enable the slots to be widened to receive the mirrors and then for the mirrors to be clamped in position, the slots being accurately machined so that the mirrors are bent into their required forms of curvature. The use of a unitary block simplifies the construction and setting up of the support means for the mirrors.

10 Claims, 4 Drawing Sheets

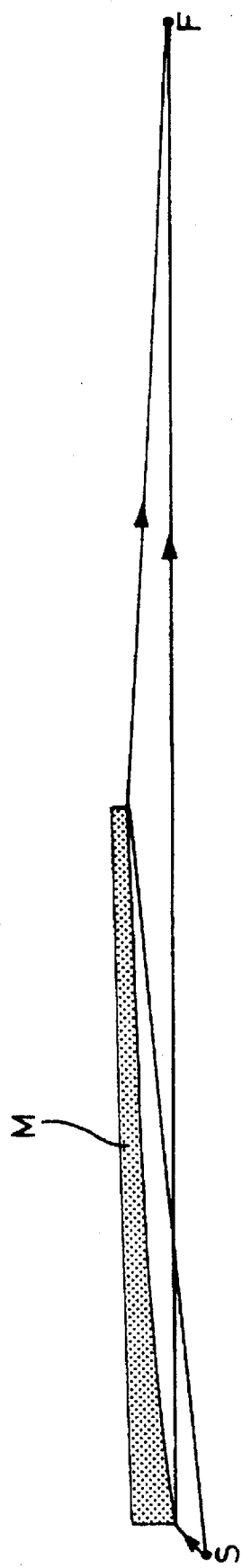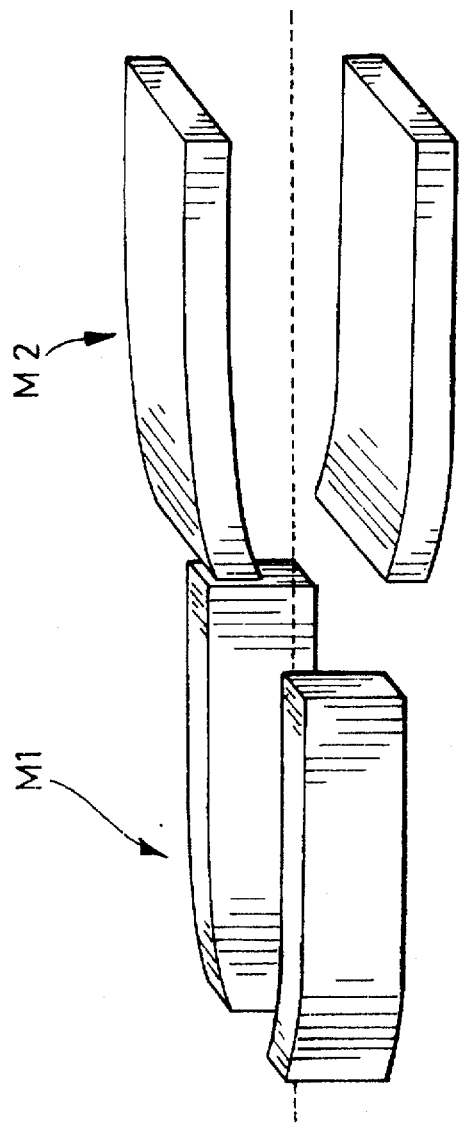
Fig. 1 PRIOR ART
Fig. 2 PRIOR ART

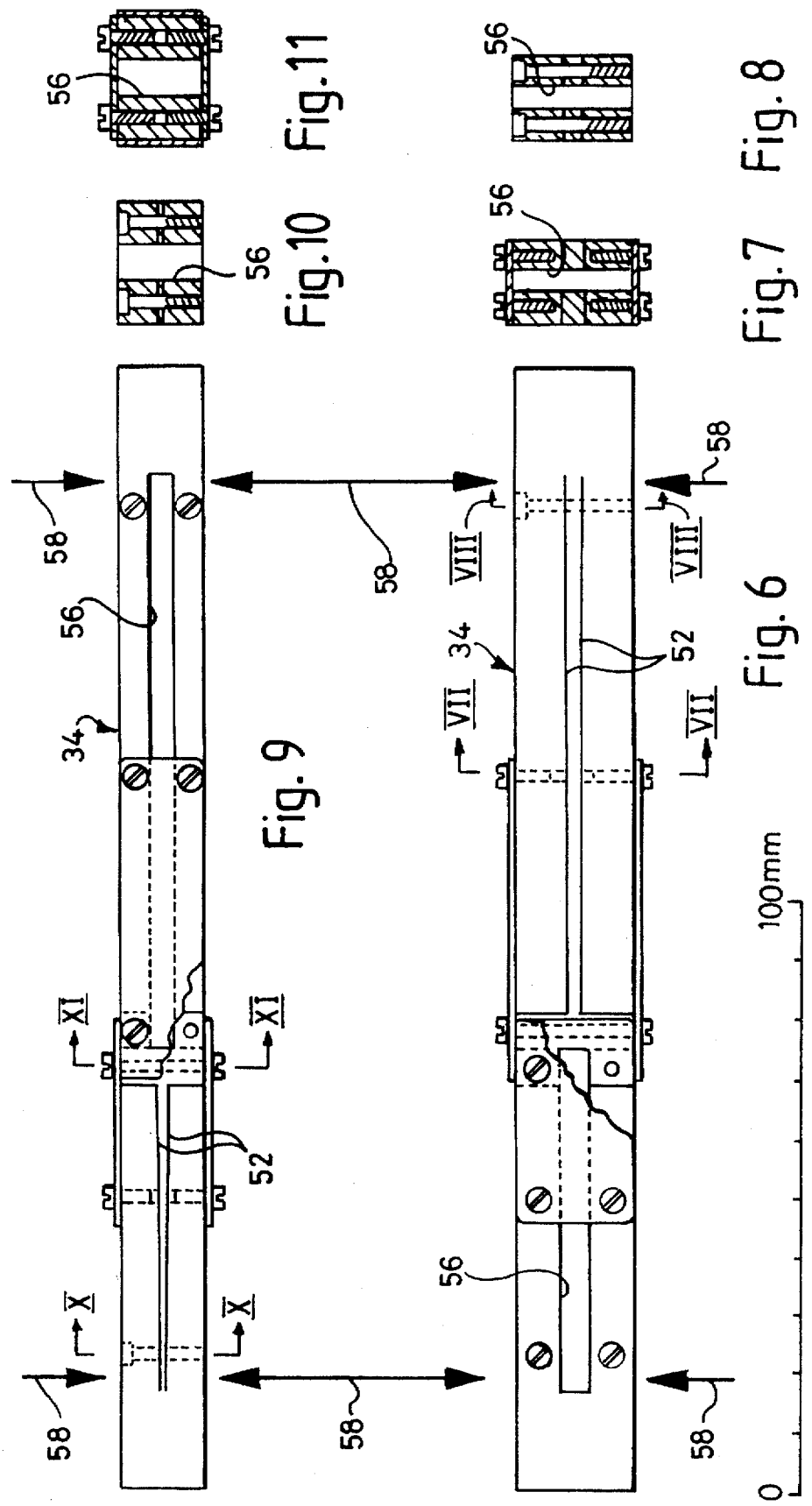

SLOTTED SUPPORT FOR X-RAY FOCUSING MIRRORS

FIELD OF THE INVENTION

This invention relates to mirror support means for supporting curved mirrors, particularly (but not exclusively) for the focusing of X-rays of wavelengths between about 0.2 μm and 1.0 m.

BACKGROUND TO THE INVENTION

In the field of focusing X-rays it is known to employ mirrors curved in one plane and flat in the orthogonal plane to produce focusing by reflection of the X-rays at glancing angles of incidence less than the critical angle of total external reflection. An example is shown in FIG. 1 of the accompanying drawings where M is the mirror, S the source and F the focus. These mirrors may have appropriate curvatures to produce convergent, divergent or parallel beams of X-rays. The curvatures may be produced by elastically bending plane plates or by appropriately grinding or otherwise shaping the mirror surface to the appropriate shape. It is also known to employ two such mirrors in tandem, each of which is curved in one plane only, the planes of curvature of the successive mirrors being perpendicular to one another so as to achieve the desired focusing in both planes by successive reflection at the two mirrors. In a known variant of this method two pairs of mirrors are used to produce a single point-focus, as shown in FIG. 2 of the accompanying drawing where M1 is a first pair of mirrors and M2 is the second pair of mirrors.

In most cases of interest the reflection only takes place at glancing angles of incidence below 1°. The mirror surface must be extremely flat, surface irregularities being less than 1 nm in order to achieve a high reflectivity. The reflecting mirror surface usually consists of a dense metal such as gold or iridium deposited on a smooth mirror substrate. Alternatively, the substrate may be coated with many alternating layers of a dense and a less dense material to provide a multi-layer structure which acts as an artificial crystal and reflects X-rays within the wavelength range of interest for structural studies with a high efficiency.

The machining of mirror surfaces to achieve at the same time the desired shape and the necessary smoothness is a very expensive process. It is easier to polish flat surfaces of glass, silicon or other materials to the required smoothness but the means then used to bend the plates elastically to the correct shape occupy a considerable amount of space and often preclude the mirrors from being mounted close to one another or to the source of X-rays. Additional space is needed for the separate alignment adjustments required for each mirror. Typically these consist of at least one translational and one tilting adjustment per mirror. The invention aims to provide an improved way of supporting mirrors.

THE INVENTION

According to the invention there is provided mirror support means comprising a metal block having a slot machined to receive a mirror which, on insertion in the slot, is bent to a desired curvature. Preferably, clamping means are provided to clamp the mirror in the slot so that the clamped mirror has a desired curvature.

Preferably the block is formed in such a way that a flexure hinge is formed by a weakened part of the block which allows the slot to be hinged open to receive the mirror and subsequently to be closed under the influence of the clamping means to clamp the mirror in the slot with the desired curvature. The invention thus relies on the use of an accurately machined slot in a metal block in order to impart a desired curvature to the mirror.

BRIEF DESCRIPTION OF THE DRAWINGS

Mirror support means according to the invention will now be described, by way of example, with reference to the accompanying drawings, in which:

FIG. 1 is a diagrammatic view of a prior art focusing mirror,

FIG. 2 is an isometic view of a prior art method employing two of mirrors for single point focus, FIG. 6 is a side elevation of a block of the mirror support means of FIG. 5, the block being illustrated at an intermediate stage of manufacture, FIGS. 7 and 8 are sectional views on the lines VII—VII and VIII—VIII respectively of FIG. 6, FIG. 9 is a plan view of the block of FIGS. 6 to 8, and FIGS. 10 and 11 are sectional views on the lines X—X and XI—XI respectively of FIG. 9.

DESCRIPTION OF THE PREFERRED EMBODIMENTS

Figure 3:
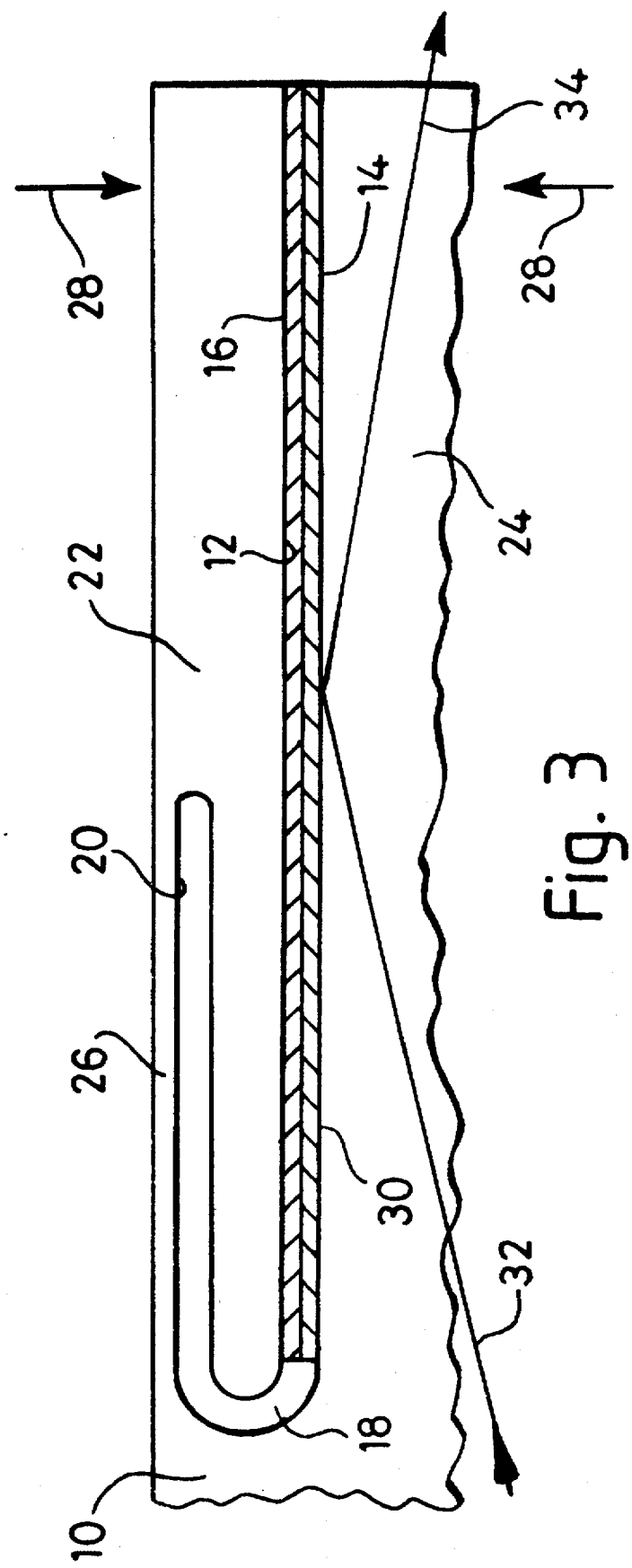
FIG. 3 is a diagrammatic sectional view through a first embodiment of mirror support means according to the invention.

Referring to FIG. 3, a metal block 10 is machined so as to incorporate a slot 12 receiving a mirror 14 and a layer of resilient backing material 16. This enables mirrors of different thicknesses to be accommodated in a given slot. The mirror receiving part of the slot is extended by a 180° bend 18 into a return length 20 of slot which defines a moveable part 22 of the block cantilevered from the remaining fixed part 24 of the block by means of a web 26 of metal forming a spring or an elastic hinge. As a consequence, the two parts 22, 24 of the block 10 can be separated to facilitate insertion of the mirror and its backing in the slot 12. After positioning of the mirror and backing in the slot 12 as shown in FIG. 3, the two parts of the block are clamped together by clamping means, indicated diagrammatically by the arrows 28. The slot 12 is accurately machined to such a shape that when the mirror is clamped in position in the slot the reflective surface 30 of the mirror presents a desired curvature so that an incident X-ray beam 32 striking the mirror at an oblique angle is reflected to provide an output beam 34 having desired characteristics. It will be appreciated that to enable the mirror to be inserted in the slot the material of the block must be sufficiently deformable to allow the web 26 to flex sufficiently for the slot 12 to be opened to accept the mirror and its backing. Furthermore, the material of the mirror must be sufficiently elastically deformable so that it is capable of being inserted into the slot and then bent to conform to the required curvature when the parts of the block are clamped together by the clamping means 28.

The slot 12 is typically about 0.7 mm wide allowing for use of mirrors between 0.3 mm and 0.5 mm in thickness, the balance being taken up with the backing material 16. The block 10 is most readily machined by means of a numerically controlled spark erosion machine, programmed to produce the required curvature in the clamped mirror, for example parabolic or elliptical. The curvature of the mirror will normally be in one plane, so that the surface 30 in the sectional view of FIG. 3 will be curved although this is not discernable in the drawing because of the small amount of curvature typically required in the mirror. To provide controlled reflection in an orthogonal plane, the block 10 may accommodate a second mirror mounted in another slot at right angles to the slot 12 and situated to the left of the part of the block illustrated in FIG. 3. Two such orthogonally placed mirrors, on which an X-ray beam is successively reflected, enable focusing of an incident X-ray beam in two orthogonal planes. For example, if one mirror is elliptical it will produce an output beam convergent in one plane and if both mirrors are elliptical the output beam will be convergent to a point. If both of the mirrors are parabolic the output beam will be parallel.

In order to collect the largest possible solid angle of X-rays diverging from an X-ray source, the arrangement of two successive mirrors in orthogonal planes may be doubled up so as to provide an arrangement having a first pair of mirrors (eg in a vertical plane) followed by a second pair of mirrors (in a horizontal plane). The embodiments of FIGS. 4 and 5 have two pairs of mirrors arranged in this way.

Figure 4:
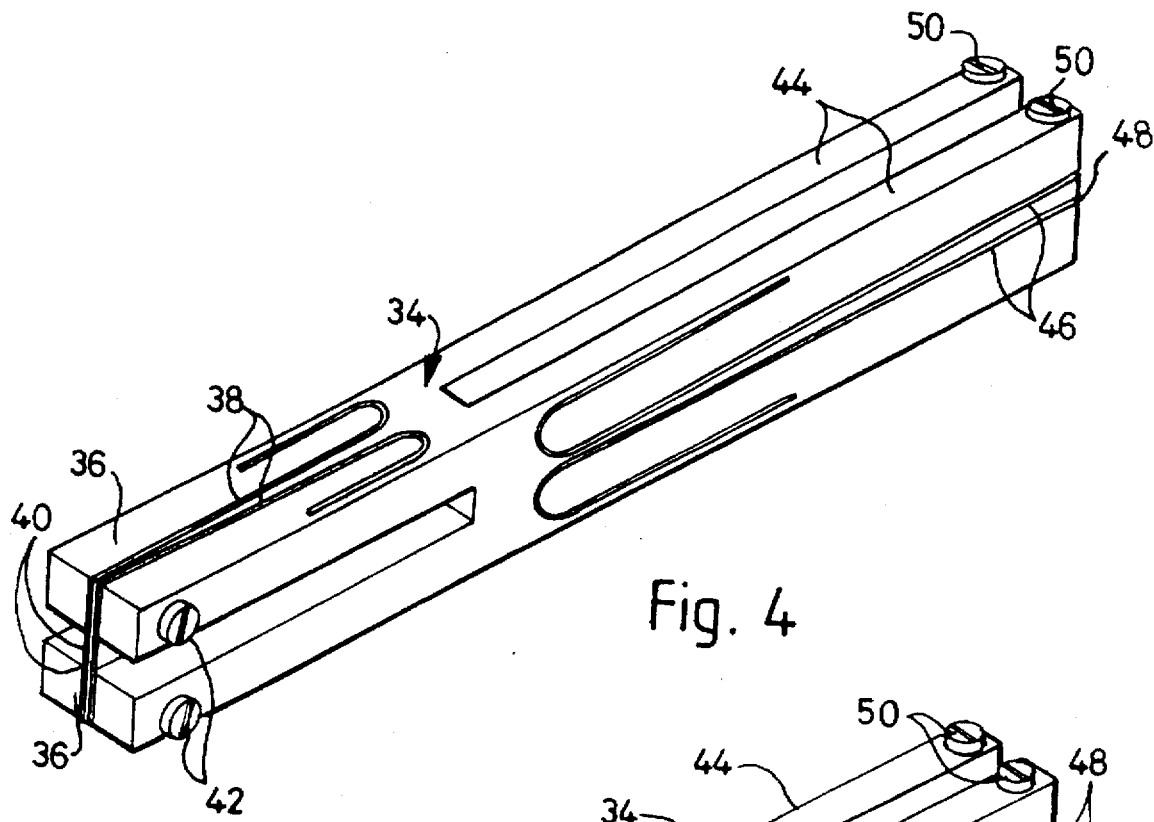
FIG. 4 is an isometric view of a second embodiment of mirror support means according to the invention.

Referring to FIG. 4, the metal block 34 has at one end a first bifurcation defining two limbs 36 each of which has a pair of mirror receiving slots 38 respectively receiving two vertical mirrors 40 which span the first bifurcation. The slots 38 effectively divide each limb 36 into three arms which are capable of being clamped together by screws 42 which form clamping means and which enable the inserted mirrors 40 to be clamped into the bifurcated end of the block. Each slot 38 has a return portion forming a spring as described with reference to FIG. 3. At the other end, the block 34 has a second and longer bifurcation in an orthogonal plane to the first bifurcation, so as to define two limbs 44 each of which has a pair of slots 46 receiving respective horizontal mirrors 48 which span the second bifurcation. Screws 50 provide clamping means for clamping the mirrors 48 in position with the desired curvature. The bifurcations extend from an intermediate volume of the block which has a through passage interconnecting the first and second bifurcations to enable X-rays to pass through the block from end to end, the X-rays being reflected first by the first pair of mirrors 40 and then by the second pair of mirrors 48 so as to be focused to a point (if both pair of mirrors are elliptical) or focused to produce a parallel output beam (if both mirrors are parabolic).

Figure 5:
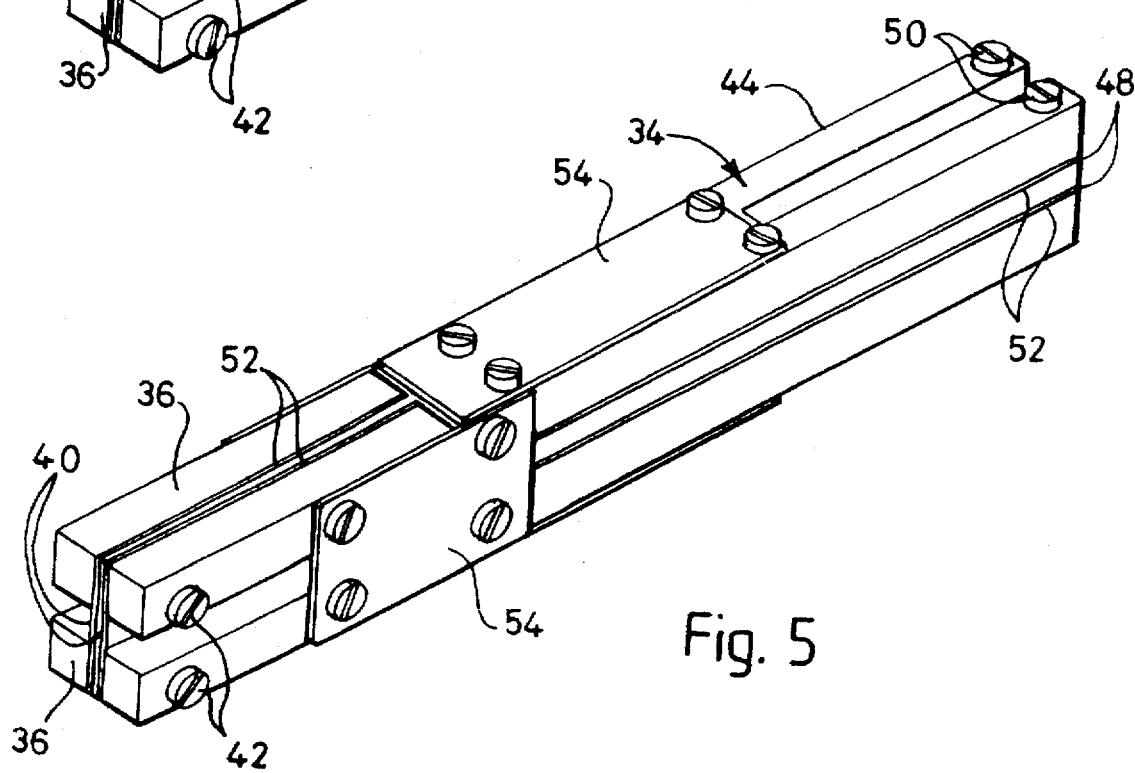
FIG. 5 is an isometric view similar to that of FIG. 4 but showing a modified construction.

The embodiment of FIG. 5 is similar to that of FIG. 4 (similar parts bearing the same reference numerals) except that all four mirror receiving slots 52 are devoid of the 180° bend and return lengths. External phosphor bronze spring plates 54 are bolted to the block 34 so as to span the bifurcations, in order to provide the necessary resilience to enable the slots 52 to be opened up to receive the mirrors and subsequently clamped by screws 42, 50.

Thus, in each of FIGS. 4 and 5 the pairs of mirrors are supported by the block 34 so as to be relatively positioned as illustrated in FIG. 2, the X-rays passing between (and being reflected by) the facing reflective surfaces of the mirrors.

FIGS. 6 to 11 show the metal block 34 of the embodiment of FIG. 5 before a final stage of manufacture. At the stage shown in FIGS. 6 to 11 the block 34 is formed with through-going slots 56 in orthogonal planes. After this, the ends of the block are cut as indicated by cut lines 58 (FIG. 6) so as to define the orthogonal bifurcations illustrated in FIGS. 4 and 5. The bifurcations run into one another in the intermediate part of the block to provide a through passage for the X-rays.

If the block is machined with adequate precision the only adjustments required are three orthogonal translations to bring the X-ray source into coincidence with one common focus of the four mirrors. This is an improvement over a conventional arrangement in which four mirrors are mounted separately and then aligned one at a time by individual translational and tilting adjustments.

The mirrors are conveniently made from float glass or from silicon wafers, both of which can be obtained with a surface roughness of less than 1nm, which is essential for a high reflectivity. However, the radii of curvature of the mirrors required for X-ray focusing are so large that thin plates of most materials have an adequate flexibility to be bent in the slotted blocks. The mirrors can be coated with a heavy metal such as gold or iridium by sputtering or evaporation in vacuo, or they can be coated with appropriate multi layers, the spacing varying along the length of the mirror. The mirror plates are coated before they are inserted in the block.

The largest solid angle of collection at the source is achieved if the parameters of the curved slot are chosen so that the largest angle of incidence is equal to the critical angle, or, in the case of a graded-spacing multi-layer mirror, equal to the glancing Bragg angle for the smallest layer spacing at the source end of the mirror.

Monolithic four-mirror blocks are particularly advantageous for use with micro-focus X-ray tubes of such a design that the distance between the source and the mirrors can be kept very small. Monolithic mirror blocks are also advantageous in X-ray spectroscopy and for X-ray imaging.

We claim:

1. A mirror assembly comprising a mirror in the form of an elastically bendable plate and mirror support means, the mirror support means comprising a metal block, said block having machined therein a curved slot with opposed faces, said faces being shaped in a complementary manner so that the mirror, upon insertion in the slot, is curved by engagement of said faces with the mirror which, as a result of being curved in the slot, presents a reflecting surface having a desired curvature, the mirror support means further including clamping means for clamping the mirror in the slot so that the clamped mirror has a desired curvature of reflecting surface, and the block incorporating or carrying an elastic hinge which allows the slot to be opened to receive the mirror and subsequently closed under the influence of the clamping means to clamp the mirror in the slot with the desired curvature of reflecting surface.

2. A mirror assembly according to claim 1, wherein the hinge is a flexure hinge formed by extending the slot to define a portion of the block which is capable of deformation with respect to the remainder of the block.

3. A mirror assembly according to claim 1, wherein the hinge is formed by separate springs attached to the block.

4. A mirror assembly comprising a mirror in the form of an elastically bendable plate and mirror support means, the mirror support means comprising a metal block, said block having machined therein a curved slot with opposed faces, said faces being shaped in a complementary manner so that the mirror, upon insertion in the slot, is curved by engagement of said faces with the mirror which, as a result of being curved in the slot, presents a reflecting surface having a desired curvature, the slot forming one of a pair of slots and the mirror forming one of a pair of mirrors for respective reception in the slots, the pair of slots being one of two such orthogonal pairs of slots for receiving pairs of mirrors in orthogonal planes, for successive reflection of an incident beam by the two pairs of mirrors.

5. A mirror assembly according to claim 4, wherein the two pairs of mirrors are elliptical in two orthogonal planes to produce an output beam convergent to a point.

6. A mirror assembly according to claim 4, wherein the two pairs of mirrors are parabolic in two orthogonal planes to produce a parallel output beam.

7. Mirror support means comprising a metal block, said block having machined therein four curved slots with each slot having oppposed faces shaped in a complementary manner to receive a corresponding mirror in the form of an elastically bendable plate which, upon insertion in the corresponding slot, is bent to a desired curvature by engagement of the faces with the mirror, the four slots, is bent to a desired curvature by engagement of the faces with the mirror, the orthogonal planes, for successive reflection of an incident beam by the two pairs of mirrors.

8. Mirror support means according to claim 7, wherein the block has one end bifurcated in a first plane to form two first limbs each of which has a pair of spaced slots for receiving a first pair or mirrors each of which spans the first bifurcation, and the block has an opposite end bifurcated in a second plane orthogonal to said first plane to form a second pair of limbs each of which has a pair of spaced slots for receiving a second pair of mirrors each of which spans the second bifurcation.

9. Mirror support means according to claim 8, wherein the mirror receiving slots separate each limb into three spaced arms, the mirror support means including clamping means acting to clamp the arms together with the mirrors in the respective slots.

10. Mirror support means according to claim 9, wherein each slot extends to the extremity of the corresponding arm to facilitate insertion for each mirror in the respective slot.

* * * * *

UNITED STATES PATENT AND TRADEMARK OFFICE
CERTIFICATE OF CORRECTION

PATENT : 5,893,549
DATED : April 13, 1999
INVENTOR(S) : Ladislav Pina Adolf Inneman et al It is certified that error appears in the above-identified patent and that said Letters Patent is hereby corrected as shown below:

Column 5, lines 19-20, should read --mirror, the four slots being constituted by two orthogonal pairs of slots for receiving pairs of mirrors in orthogonal planes, for successive reflection of an incident beam by the two pairs of mirrors.--.

Column 6, line 18, should read --to facilitate insertion of each mirror in the respective slot.--.

Signed and Sealed this

Eighteenth Day of April, 2000

Attest:

Q. TODD DICKINSON

*Attesting Officer*    *Director of Patents and Trademarks*